United States Patent [19]

Duttarer et al.

[11] 3,954,152
[45] May 4, 1976

[54] VEHICLE SPEED CONTROL

[75] Inventors: Ralph M. Duttarer, St. Joseph; Richard R. Hushower, Buchanan, both of Mich.

[73] Assignee: Clark Equipment Company, Buchanan, Mich.

[22] Filed: July 15, 1974

[21] Appl. No.: 488,336

[52] U.S. Cl. .............................. 180/108; 74/513; 123/103 R
[51] Int. Cl.² ......................................... B60K 31/00
[58] Field of Search .................. 180/77 R, 105–110; 74/513, 526; 123/103 R

[56] References Cited
UNITED STATES PATENTS

| | | | |
|---|---|---|---|
| 2,519,859 | 8/1950 | Teetor | 74/526 X |
| 2,776,581 | 1/1957 | Hamlin | 74/526 |
| 3,059,715 | 10/1962 | Lopez | 180/77 R |
| 3,130,599 | 4/1964 | Haas | 74/526 |

*Primary Examiner*—Kenneth H. Betts
*Attorney, Agent, or Firm*—Kenneth C. Witt

[57] ABSTRACT

An auxiliary speed control system for a vehicle having an engine, a multiple ratio transmission and an operator's foot pedal for varying the engine speed. To obtain a vehicle speed which is different from any of those normally provided by the multiple ratio transmission, a device is moved into proximity to the operator's foot pedal. The device is contacted by the foot pedal when the foot pedal is depressed. When the speed of the vehicle reaches a predetermined maximum, the device acts on the foot pedal to prevent the operator from exceeding the selected speed.

8 Claims, 9 Drawing Figures

3,954,152

VEHICLE SPEED CONTROL

The invention herein described was made in the course of or under a contract with the Department of Defense.

BACKGROUND OF THE INVENTION

1. Field of the Invention

This invention relates to vehicles which embody multiple ratio transmissions to provide a plurality of operating speeds and more particularly to special purpose and off-the-road vehicles which in some cases require transmissions with a considerable number of ratios to enable the vehicles to operate under a variety of conditions.

2. Description of the Prior Art

Most specialized vehicles for such uses as excavating, earth moving, construction work, material handling and the like utilize a multiple ratio transmission to afford the operator a selection of speed ranges in which he can operate the vehicle. Such transmissions may be manually or power shifted. Such transmissions provide torque multiplication ranging from the largest ratio which provides the greatest torque multiplication to the smallest ratio which provides the least. The speed of the engine normally may be varied by the operator when the transmission is in any of the ratios, but each ratio of the transmission provides a maximum vehicle speed with such maximum speeds being inversely proportional to the torque multiplication provided by the transmission.

Generally speaking the cost of transmissions increases as the number of ratios provided by the transmission increase, and consequently if it is possible to add another operating speed to the vehicle without adding another ratio to the transmission it is possible in many cases to reduce the vehicle cost, and the present invention provides an auxiliary speed control which conveniently adds another speed for a vehicle at moderate cost and without adding another ratio to the transmission.

SUMMARY OF THE INVENTION

In carrying out this invention in one preferred form an auxiliary speed control system is provided for a vehicle which has an engine, a multiple ratio transmission and an operator's foot pedal for varying the engine speed. The auxiliary speed control system includes a device which may be moved into proximity with the operator's foot pedal and which is contacted by the foot pedal when it is depressed. The device includes means for yieldably resisting depression of the foot pedal when the foot pedal is in contact with the device. The system also includes means for producing a signal responsive to the speed of the vehicle and other means responsive to such signal for overriding the yieldable resisting means to limit the amount the foot pedal can be depressed and thus limit the speed of the vehicle to a predetermined amount.

DESCRIPTION OF PREFERRED EMBODIMENT

Figure 1:
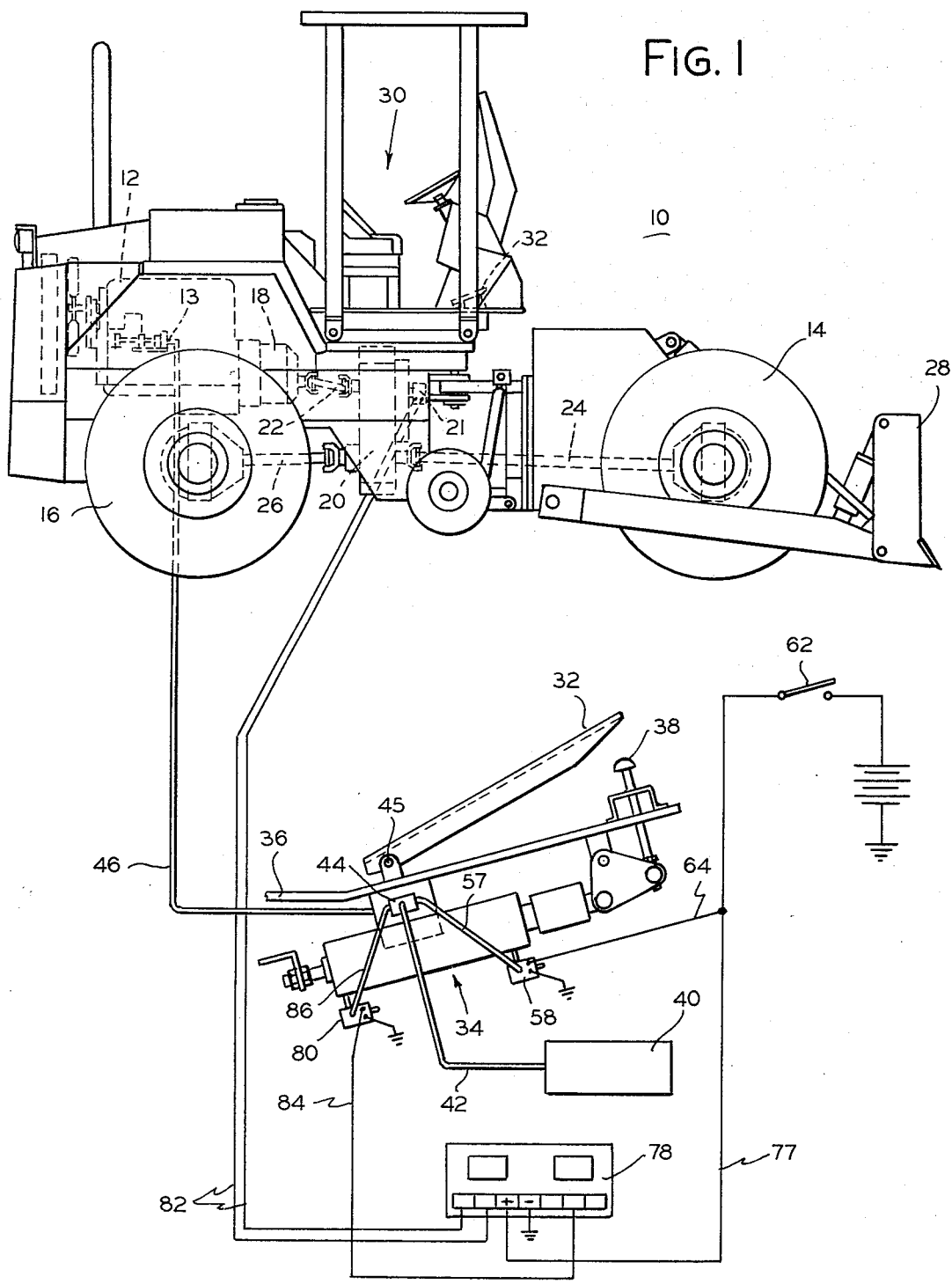
FIG. 1 is a diagrammatic illustration of the invention shown in the inoperative condition.

Referring to FIG. 1 of the drawing there is shown diagrammatically a vehicle which is indicated generally by the numeral 10. The vehicle 10 includes an engine 12 which in this illustration is a diesel engine, which drives all four wheels through an intervening drive mechanism, the front wheels of the vehicle being indicated by the numeral 14 and the rear wheels by the numeral 16, only one front wheel and one rear wheel being visible in FIG. 1. The intervening drive mechanism in this illustration includes a hydraulic torque converter 18 which is directly coupled to the engine, and a multiple ratio power shift transmission 20 which is connected by a shaft 22 to be driven by the engine 12 through the torque converter 18. There are connecting shafts 24 and 26 between the bottom of the transmission and the front and rear wheel respectively for driving all four wheels of the vehicle. As illustrated, the vehicle 10 has an earth moving blade 28 at the front.

The vehicle 10 includes an operator's station indicated generally at 30, and a foot pedal 32 is shown in the usual position in the operator's station with the same foot pedal also shown enlarged in the diagrammatic lower portion of FIG. 1. The engine 12 includes a throttle mechanism 13, and the transmission 20 in this illustrative embodiment includes a generator 21 mounted thereon and connected to a transmission shaft whose speed is proportional to the speed of the drive shafts 24 and 26 and consequently to the speed of the vehicle.

The present invention includes an auxiliary speed control system for the vehicle 10 which provides in effect an additional operating speed, in addition to those provided by the multiple ratio transmission 20. For example, the transmission 20 may provide four ratios and the utilization of the present invention provides an additional operating speed without the necessity of adding gears and shafts and other parts in the transmission or substituting a different transmission which would provide five ratios.

The lower portion of FIG. 1 of the drawing shows the operator's foot pedal 32 and a device 34 which is operatively associated with the foot pedal 32 in a manner to be described. As shown, the device 34 is mounted beneath the floor board 36 of the vehicle with a portion 38 extending through an opening in the floor board, approximately normal to the pedal 32, and arranged to be contacted by the foot pedal 32 under operating conditions to be explained.

It will be appreciated that device 34, floor board 36 and the other parts connected mechanically thereto are located on vehicle 10 immediately below foot pedal 32 although for purposes of illustration and explanation they are shown only in the lower diagrammatic portion of FIG. 1.

Figure 2:
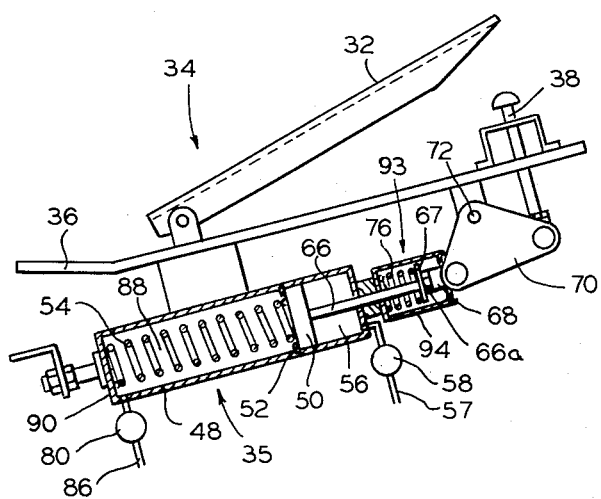
FIG. 2 is an enlarged sectional view of a device which forms a portion of the system of FIG. 1.
Figure 3:
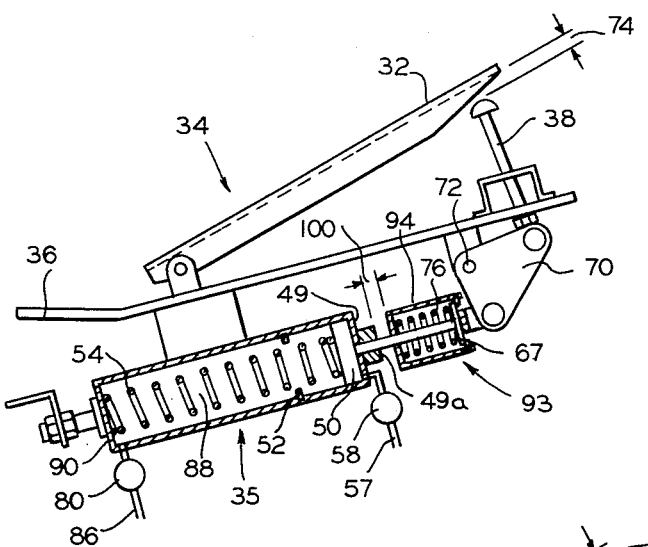
FIG. 3 is a view of the same portion of the device as FIG. 2 showing an operating condition.
Figure 4:
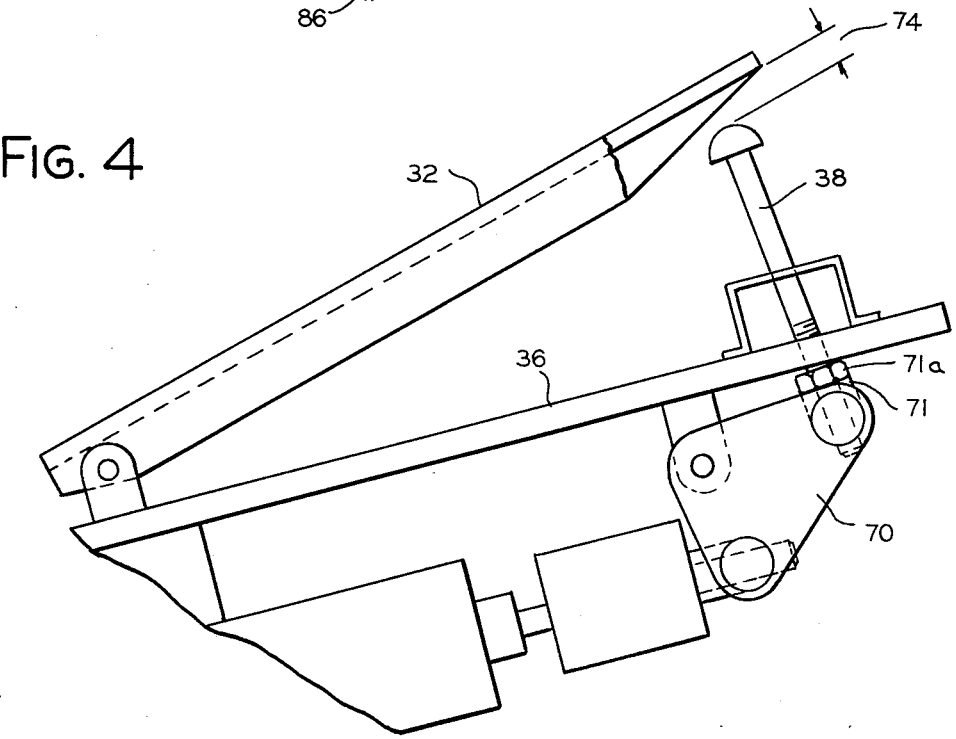
FIG. 4 is an enlarged fragmentary view of the device in the position of FIG. 3.

The abutment portion 38 of device 34 is shown in its retracted position in FIGS. 1 and 2 of the drawing while FIGS. 3 and 4 show portion 38 in extended or operative condition.

The present auxiliary speed control system is shown applied to a vehicle having a diesel engine, with the throttle 13 of the diesel engine operated by means of compressed air in a known manner. Referring to FIG. 1, compressed air is stored in a tank 40 and passes through a conduit 42 and a valve 44 which is controlled by the operator's foot pedal 32. As the foot pedal is depressed, that is, pivoted clockwise from the quiescent position shown in FIG. 1 about axis 45, compressed air is directed through conduit 46 to the throttle 13. In the usual manner, as the foot pedal is depressed, more air is directed through conduit 46 to increase the amount of fuel injected into the engine 12, it being understood that the speed of the engine 12 thus is responsive to the position of foot pedal 32 in the normal manner when the present invention is not in operation.

Compressed air is utilized also to operate device 34 to modify the operation of the foot pedal 32 and consequently the speed of the engine under certain conditions. FIG. 2 shows schematically the details of device 34 in its retracted condition as in FIG. 1. The device 34 includes a portion 35 which comprises a cylinder 48 which has a piston 50 therein to move reciprocally between two extreme positions, the retracted position being shown in FIG. 2 in which the piston 50 is in its left or retracted position against the stop 52. Compression springs 54 and 76 urge the piston 50 toward the right, but in the retracted position there is air pressure in chamber 56 to the right of piston 50 which overcomes the spring forces and holds the piston against the stop 52. This results from normally open solenoid valve 58 which directs compressed air from conduit 42 (see FIG. 1) through conduit 57 and then into chamber 56. In this condition of device 34, that is, FIG. 2, the auxiliary speed control of this invention is not operative and the engine 12 operates normally by manipulation of operator's foot pedal 32.

However, under some conditions of operation it is desirable to provide an additional operating condition or speed range. Typically this is a speed range which has an upper limit which is less than the upper limit provided by the greatest ratio in the transmission 20, and the transmission 20 ordinarily is shifted to its greatest ratio before the present auxiliary speed control system is energized, although it will be appreciated that the present system can be utilized with the transmission 20 in any of its ratios.

To energize the auxiliary speed control system, switch 62 is closed. See FIG. 1. By means of electric conductor 64 this energizes the solenoid of normally open solenoid valve 58, closing the valve and allowing the escape of compressed air from chamber 56. This in turn allows compression springs 54 and 76 to move piston 50 to its right hand position illustrated in FIG. 3, adjacent the right or rod end 49 of cylinder 48.

Figure 8:
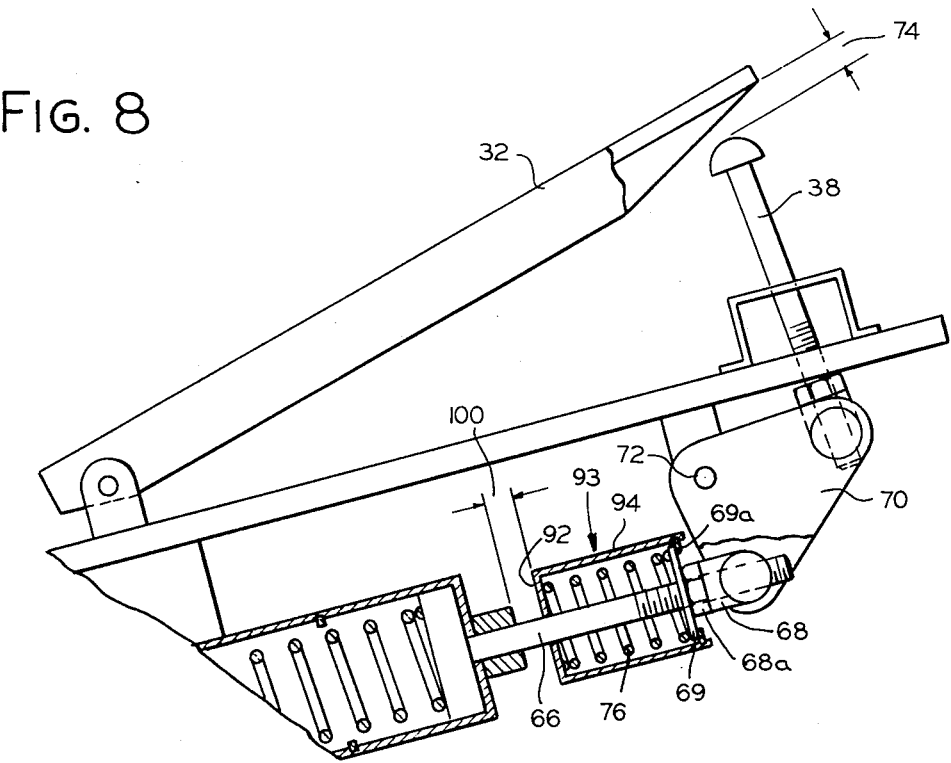
FIG. 8 is an enlarged fragmentary view of a portion of the device shown in other figures.

Piston 50 is mounted on a rod 66 which is connected by means of clevis 68 to bellcrank 70. As shown in FIG. 8, for example, bellcrank 70 may comprise two spaced plates with the clevis 68 and other parts mentioned herein located between such plates. The rightward movement of rod 66 and clevis 68 as a result of the movement of piston 50 causes bellcrank 70 to pivot about axis 72 and move abutment member 38 upwardly in proximity to the underside of foot pedal 32 as illustrated in FIG. 3, leaving a gap indicated at 74.

In this condition of device 34, as the operator depresses foot pedal 32 to increase the speed of engine 12, the foot pedal 32 after a small movement which closes gap 74, contacts member 38; and further movement of the foot pedal 32 then requires the operator to compress spring 54 initially and then both springs 54 and 76 in order to accomplish increased opening of the throttle and an increase in engine and vehicle speed. However, when the vehicle speed reaches a preselected maximum, the present system acts to override the springs and restore piston 50 and rod 66 along with abutment 38 to their extreme extended positions, shown in FIG. 3, thus preventing any depression of the foot pedal 32 beyond the amount allowed by gap 74.

The speed limiting action just described occurs through the action of a signal from generator 21 which is connected to a shaft of the transmission, which signal is proportional to the speed of the vehicle. When switch 62 is closed it energizes a relay 78 which may be of the solid state type, through conductor 77. When generator 21 produces a voltage of a magnitude which indicates that the desired maximum vehicle speed has been reached, relay 78 operates to open normally closed solenoid valve 80 by means of electrical connections 82 to the relay 78 and 84 from the relay 78 to the solenoid valve. The opening of valve 80 admits compressed air from conduit 42 through a conduit 86 into chamber 88 formed between piston 50 and the left or head end 90 of device 34. The air pressure in chamber 88 moves piston 50 to the right as described previously.

It will be appreciated that whenever the vehicle speed drops below the preselected maximum relay 78 de-energizes solenoid valve 80, allowing the escape of compressed air from chamber 88. This in turn allows the operator by pushing harder on foot pedal 32 to compress springs 54 and 76 to move piston 50 toward its left hand position again to provide more engine torque as necessary to maintain the desired speed. When the system, through the operation of sensor 21 recharges chamber 88 with air pressure, the cycle is repeated.

The device 34 has two principal adjustments and these are explained next, followed by a further explanation of the operation of the device and the speed control system.

Figure 5:
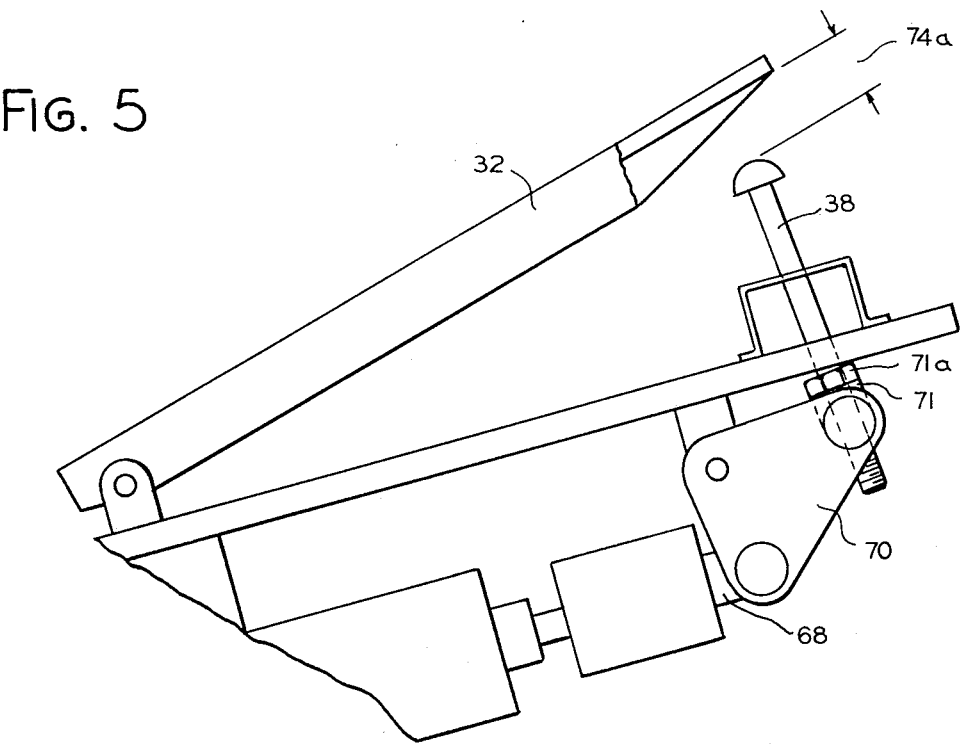
FIG. 5 is the same as FIG. 4 except with a different adjustment.

The amount of extension of abutment 38 relative to bellcrank 70 can be adjusted by adjusting abutment member 38 axially, along its own axis. FIG. 4 is a fragmentary view which shows this portion of device 34 in the same condition as in FIG. 3, with some parts omitted for the sake of clarity, and it will be observed in this typical construction that abutment member 38 is screwed into clevis 71 and is locked in position relative to clevis 71 by means of a lock or jam nut 71a. It will be appreciated that it is possible readily to adjust abutment member 38 axially by loosening jam nut 71a and making the necessary adjustment, followed by retightening of jam nut 71a. FIG. 5 is the same as FIG. 4 except it shows abutment member 38 in a condition in which it has been adjusted so that it is screwed farther into clevis 71. This increases the gap between abutment member 38 and foot pedal 32 and this increased gap is shown in FIG. 5 by the identifying character 74a.

The adjustment just explained to adjust gap 74 is considered the no-load adjustment of the present invention. The gap 74 (or 74a) is adjusted so that movement of the foot pedal 32 to close such gap maintains the vehicle 10 at the desired speed when it is not loaded. It will be appreciated that even if the electrical system has been turned on and sensor 21 has operated to cause full extension of abutment member 38 that gap 74 or 74a nevertheless will be available for movement of the operator's foot pedal 32. Thus, to facilitate an understanding of the present invention it should be understood that it is possible to adjust gap 74a to be large enough so that even though abutment 38 is fully extended the speed of the vehicle nevertheless might exceed the speed at which sensor 21 is set to operate; and the present invention would not be operative to exert an upper limit on the speed under such conditions. However, in normal use, the gap 74a is kept small enough that at no-load the speed of the vehicle will not exceed the desired preselected amount.

It will be appreciated that the description of operation assumes level ground and relatively normal operating conditions. It is possible to nullify the operation of the auxiliary speed control system by driving the vehicle down a steep grade so that gravity contributes to the forces propelling the vehicle in addition to the engine.

Figure 6:
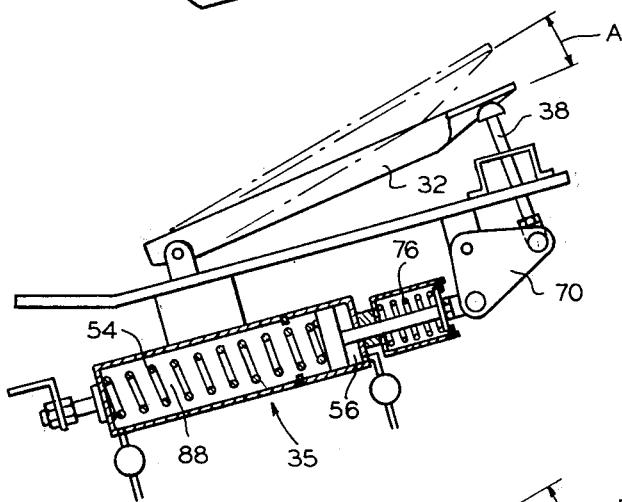
FIG. 6 is a view of the device in a transitory operating condition.

FIG. 6 of the drawing shows the device 34 in a condition in which abutment 38 is adjusted to the same extension as FIG. 3. In addition, switch 62 is closed and the sensor 21 is thus conditioned for operation but the speed is low enough that it has not operated relay 78. Under these circumstances, there is no air pressure in either chamber 56 or 88 and the position of piston 50 is determined by the amount of depression of foot pedal 32. In FIG. 6 the foot pedal 32 has been depressed through the angle A and this is enough to move rod 66 and piston 50 thereon to the position illustrated in FIG. 6 in which the gap 100, seen in FIG. 3, has been closed. This means that spring 54 is partially compressed and that further movement of foot pedal 32 causes compression of both spring 54 and spring 76.

Figure 7:
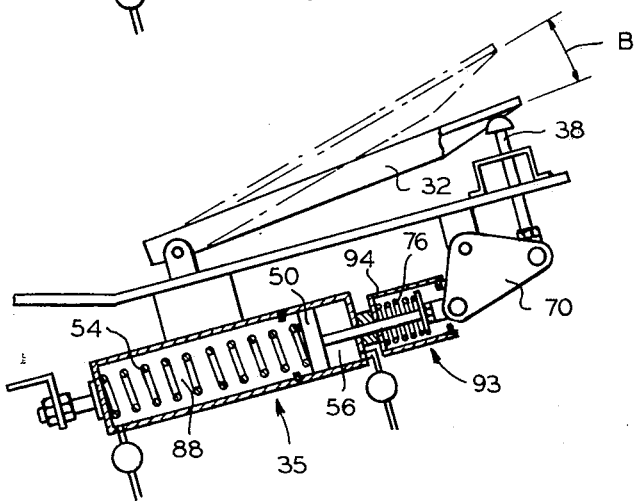
FIG. 7 is the same as FIG. 6 except with a different adjustment.

FIG. 7 is the same as FIG. 6 except it shows further depression of foot pedal 32 to increase the flow of fuel to the engine, and to move pedal 32 through an angle B from its initial quiescent position to the position shown in FIG. 7, further depressing abutment 38 and compressing both springs 54 and 76.

The operator can achieve the positions of FIGS. 6 and 7 as long as the speed of the vehicle does not become great enough to cause sensor 21 to operate. When operation of the sensor occurs the sequence of events previously described occurs in which air pressure in chamber 88 forces piston 50 to the extreme right end of cylinder 48 and restores abutment 38 to its maximum extended position.

FIG. 8 shows an enlarged view of a compression spring device 93 which includes a cylindrical member or housing 94 which contains spring 76, and associated parts, all of which forms a portion of device 34. Spring 76 is precompressed and is held between the end 92 of housing 94 and abutment member or washer 69 which in turn is held by a snap ring 69a. The compression spring device 93 can be adjusted to adjust the maximum tractive effort or drawbar pull which can be exerted by the vehicle 10 when the system of the present invention is in operation.

Figure 9:
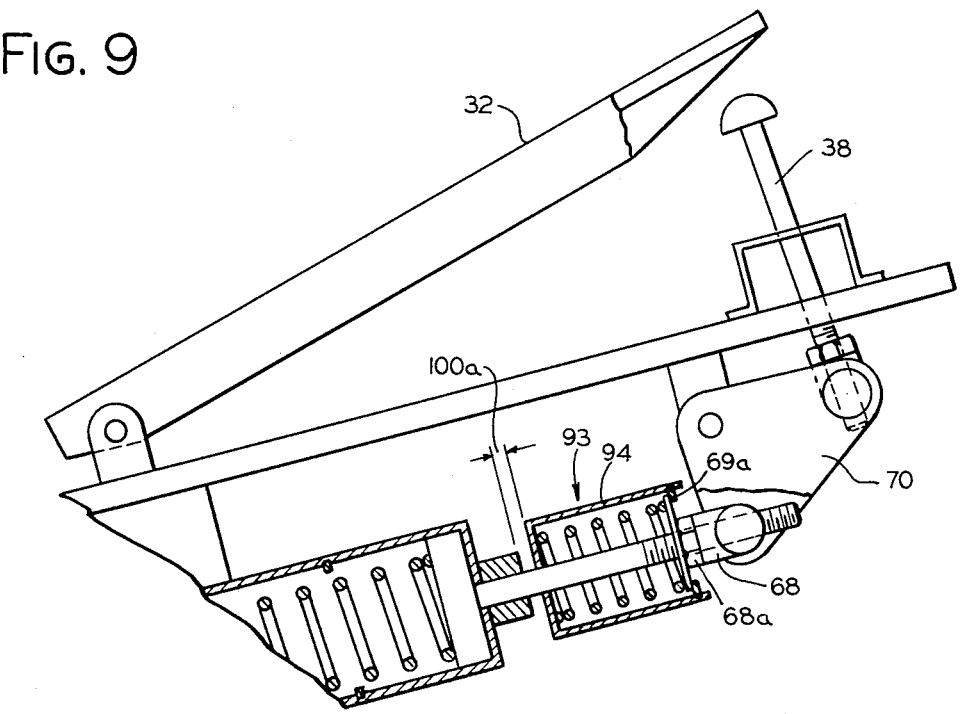
FIG. 9 is the same as FIG. 8 with a different adjustment.

FIG. 9 is the same as FIG. 8 except illustrating how such adjustment of device 93 is made. In FIG. 9 the length of rod 66 has been shortened by screwing it into clevis 68, utilizing jam nut 68a first to release rod 66 for such movement and then tightening up the connection again after the adjustment has been made. As is shown in FIG. 9, the gap 100 of FIGS. 3 and 8 has been reduced and it has been indicated by 100a in FIG. 9. Such an adjustment increased the tractive effort or drawbar pull the present speed control system causes vehicle 10 to maintain, but it is understood that this is less than if it were possible to operate foot pedal 32 to open the throttle fully, because the engine is allowed to run at only part throttle. In the position shown in FIG. 9, the control system of this invention causes the vehicle 10 to maintain a higher tractive effort or drawbar pull than when in the condition of FIG. 8. This is because the shortening of rod 66 as mentioned has the effect of increasing gap 74 by pulling abutment 38 downwardly, and thus, as the bellcrank 70 pivots when abutment 38 is depressed by the operator's foot pedal 32, the rod 66 and piston thereon moving to the left toward the stop 52 allows abutment 38 to move farther in FIG. 9 than in FIG. 8, and this in turn produces a greater increase in fuel to the engine.

FIGS. 2, 7 and 8 show three different conditions of spring device 93. In FIG. 2, the air pressure in chamber 56 has overcome both springs 76 and 54 and spring 76 is in its condition of maximum compression. In FIG. 7, spring 76 is in a condition of intermediate compression. In FIG. 8 it is in a condition of minimum compression (or maximum extension). The spring 76 is held between an abutment member or washer 69 which abuts against lock nut 68a and the opposite end 92 of housing 94; and in FIG. 8 spring 76 is in its condition of maximum extension although it is slightly pre-compressed in this condition.

It will be appreciated that when the transmission 20 is put in the greatest ratio position and the present auxiliary speed control system is energized that the vehicle then is limited to a lower speed than otherwise would be possible if the present auxiliary speed control system were not used. This additional lower speed range for the vehicle is not accompanied by additional torque multiplication but in many applications it is not necessary to multiply the torque as well as reduce the speed. The additional speed range provided by this invention can be selected to provide a predetermined torque from the transmission which can be translated into a predetermined tractive effort or drawbar pull by the vehicle. The minimum amount of such tractive effort or drawbar pull can be changed by properly proportioning the elements of the device 34 and by the adjustment of such device as described.

While we have described and illustrated herein the best mode contemplated for carrying out this invention it should be understood that modifications may be made by those skilled in the art. Accordingly, it should be understood that we intend to cover by the appended claims all such modifications falling within the true spirit and scope of our invention.

We claim:

1. In a vehicle having an engine, a multiple ratio transmission and an operator's foot pedal for varying the engine speed, an auxiliary speed control system comprising a device selectively movable into proximity with the foot pedal and away from the foot pedal, the said device arranged when in proximity to the foot pedal to be contacted by the foot pedal when the foot pedal is depressed, the said device including means yieldably resisting depression of the foot pedal when the foot pedal is in contact with the said device, means producing a signal responsive to the speed of the vehicle, and means responsive to the said signal for overriding the said yieldable resisting means positively to limit the amount the foot pedal can be depressed and thereby limit the speed of the vehicle to a predetermined amount.

2. An auxiliary speed control system as in claim 1 in which there is a gap between the said foot pedal in its quiescent position and the said device when it is moved into proximity with the foot pedal, and means for adjusting the said gap to adjust the maximum empty vehicle speed.

3. An auxiliary speed control system as in claim 1 in which there is a gap between the said foot pedal in its quiescent position and the said device when it is moved into proximity with the foot pedal, and means for adjusting the said gap to adjust the maximum tractive effort of the vehicle when loaded.

4. An auxiliary speed control system as in claim 1 in which there is a gap between the said foot pedal in its quiescent position and the said device when it is moved into proximity with the foot pedal, means for adjusting the said gap to adjust the empty vehicle speed, and additional means for adjusting the said gap to adjust the maximum tractive effort of the vehicle when loaded.

5. An auxiliary speed control device for location in association with and beneath the operator's speed control foot pedal, comprising an abutment member located approximately normal to the foot pedal, means for moving the said abutment member away from the foot pedal to an inoperative position, yieldable means for moving the said abutment member into an extended position adjacent the foot pedal, the said yieldable means allowing depression of the said abutment member by the said foot pedal by variable amounts, and means responsive to a selected speed signal for positively overriding the said yieldable means and moving the said abutment member to its said extended position.

6. A speed control device as in claim 5 in which there is a gap between the foot pedal and the said abutment member in the quiescent position of the foot pedal and the extended position of the abutment member, and means for adjusting the said gap.

7. A speed control device as in claim 6 including additional means for adjusting the said gap.

8. A speed control device as in claim 7 comprising a bellcrank member to which the said abutment member is connected and a spring loaded piston and cylinder portion which likewise is connected to the said bellcrank member.

* * * * *